(12) United States Patent
Regan

(10) Patent No.: US 6,876,294 B1
(45) Date of Patent: Apr. 5, 2005

(54) TRANSPONDER IDENTIFICATION SYSTEM

(75) Inventor: Bernard John Regan, South Croydon (GB)

(73) Assignee: Identec Limited, Durham (GB)

(*) Notice: Subject to any disclaimer, the term of this patent is extended or adjusted under 35 U.S.C. 154(b) by 0 days.

(21) Appl. No.: 09/376,198

(22) Filed: Aug. 18, 1999

(51) Int. Cl.$^7$ .................................................. H04Q 5/22
(52) U.S. Cl. .................. 340/10.32; 340/10.1; 340/10.2; 340/10.42; 340/10.4; 340/10.3; 340/572.1; 340/825.52
(58) Field of Search .............................. 340/10.1, 10.2, 340/10.32, 10.41, 10.42, 10.4, 825.52, 10.3, 5, 61, 572.1, 825.53; 455/41.2

(56) References Cited

U.S. PATENT DOCUMENTS

| | | | |
|---|---|---|---|
| 4,471,345 A | 9/1984 | Barrett, Jr. ................... 340/572 |
| 4,691,202 A | * 9/1987 | Denne et al. ........... 340/825.54 |
| 5,339,073 A | * 8/1994 | Dodd et al. ............ 340/825.31 |
| 5,365,551 A | * 11/1994 | Snodgrass et al. ............. 375/1 |
| 5,410,315 A | 4/1995 | Huber ......................... 342/42 |
| 5,455,575 A | 10/1995 | Schuermann ................. 342/42 |
| 5,489,908 A | 2/1996 | Orthmann et al. ............ 342/42 |
| 5,550,547 A | 8/1996 | Chan et al. .................... 342/42 |
| 5,602,538 A | * 2/1997 | Orthmann et al. ......... 340/10.2 |
| 5,646,607 A | 7/1997 | Schurmann et al. ... 340/825.54 |
| 5,751,570 A | * 5/1998 | Stobbe et al. ............... 364/140 |
| 6,091,319 A | * 7/2000 | Black et al. ............... 340/10.2 |

FOREIGN PATENT DOCUMENTS

| | | |
|---|---|---|
| EP | 0 029560 A1 | 10/1980 |
| EP | 0 226 402 A2 | 12/1986 |
| EP | 0 585 132 A1 | 8/1993 |
| EP | 05851332 A1 | 8/1993 |
| WO | WO97/01826 | 1/1997 |

* cited by examiner

Primary Examiner—Michael Horabik
Assistant Examiner—Vernal Brown
(74) Attorney, Agent, or Firm—Gordon & Jacobson, PC

(57) ABSTRACT

A transponder identification system comprising a plurality of transponders and an interrogation device arranged to identify each of the transponders by transmitting successive interrogation signals according to a systematic search strategy, wherein the search is truncated where the interrogation device receives fewer than a predetermined number of different responses from the transponders, to a transmitted interrogation signal.

8 Claims, 3 Drawing Sheets

TRANSPONDER IDENTIFICATION SYSTEM

FIELD OF THE INVENTION

The present invention relates to a transponder identification system.

BACKGROUND OF THE INVENTION

Various systems are known in which an interrogation device (reader) can determine the respective identities of two or more transponders (tags) lying within its detection field.

GB-2202981 and U.S. Pat. No. 5,339,703 describe one known type of identification system which uses a "tree and branch" search methodology to identify transponders. Each transponder has stored therein a unique identity code comprising a plurality of fields, each field holding a respective value selected from a plurality of possible values. Each value is typically represented as a short binary code.

The system identifies transponders by first transmitting a radio frequency initiation signal, in response to which each transponder, within range, will transmit a radio frequency response signal in a time slot corresponding to the value held by the transponder in a first field. For example, a transponder having the value 3 stored in its first field might transmit a response signal in a third time slot, a transponder having the value 1 in a first time slot, etc.

The interrogation device then transmits, in turn, the or each value held by at least one transponder in its first field, in response to which any unidentified transponder, having that value in its first field, will transmit a response signal in a time slot corresponding to the value held by the transponder in a second field.

The interrogation device then transmits, in turn, the or each combination of values held by at least one transponder in its first and second fields, in response to which any unidentified transponder, having that combination of values in its first and second fields, will transmit a response signal in a time slot corresponding to the value held by the transponder in a third field, and so on until the identity of each transponder has been determined.

However, the above process can be time consuming, particularly where the identity code of each transponder comprises a large number of fields.

We have found that, for a given number of transponders, each arranged to reply in one or other of a given number of possible time slots, the number of time slots in which a response is received by the interrogation device may be used as an estimate of the likelihood that two or more transponders have responded in the same time slot.

Based upon this discovery, we have now devised a transponder identification system which is considerably more efficient than existing identification systems.

SUMMARY OF THE INVENTION

In accordance with the present invention, there is provided a transponder identification system comprising:

a plurality of transponders, each comprising means for storing therein a unique identity code comprising a plurality of fields, each field holding a respective value selected from a plurality of possible values; and an interrogation device arranged to identify each of said transponders by transmitting successive interrogation signals, each interrogation signal comprising a respective value or combination of values to which any transponder holding the or each value in a corresponding field will respond by transmitting a group response signal to indicate the value held by the transponder in a further field, the interrogation device being further arranged such that, where fewer than a predetermined number of different group response signals are transmitted in response to the transmission of a particular value or combination of values, the interrogation device will transmit, in turn, the respective combination of values corresponding to the or each different group response signal it has received, to which any unidentified transponder holding that combination of values in its corresponding fields will respond by transmitting the remainder of its unique identity code, the interrogation device being arranged to distinguish between two or more transponders which may simultaneously transmit the remainder of their respective identity codes in response to the interrogation device's transmission of a particular value or combination of values.

Using this system, not all of a transponder's fields need be interrogated for that transponder to be fully identified and so the overall time taken to identify the transducers is substantially reduced.

The interrogation signals are preferably transmitted as part of an ordered tree-search process, in which the interrogation device is preferably arranged to transmit an initiation signal, in response to which each transponder will transmit a group response signal corresponding to the value held by the transponder in a first field, so that the interrogation device may transmit, in turn, the or each value held by at least one transponder in its first field, in response to which any unidentified transponder having that value in its first field will transmit a group response signal corresponding to the value held by the transponder in a second field, so that the interrogation device may transmit, in turn, the or each combination of values held by at least one transponder in its first and second fields, in response to which any unidentified transponder having that combination of values in its first and second fields will transmit a group response signal corresponding to the value held by the transponder in a third field, and so on, until the identity of each transponder has been determined.

In certain circumstances, the interrogation device may receive transmissions from only one or other of the simultaneously transmitting transponders. This would typically be the case if each transponder were to transmit a modulated signal of constant amplitude e.g. a phase or frequency modulated signal, particularly if the signals were transmitted at a relatively low frequency at which the rate of signal attenuation with distance from the transmitter was very high. The system is therefore preferably arranged such that, once a transponder has successfully responded to a particular value or combination of values to provide the interrogation device with the remainder of its identity code, an acknowledgment signal comprising the full identity code of the transponder is then transmitted by the interrogation device. The identified transponder, having received an acknowledgment signal, will preferably not transmit a response thereto and will be prevented from responding to further interrogation signals. The transponder will preferably, however, continue to respond to an "are you still there" signal comprising either the transponder's full identity code or another code which uniquely defines the transponder. The or each other transponder, having the same said value or combination of values in its corresponding fields, will, on the other hand, respond either to the acknowledgment signal (where the identified transponder does not transmit a response thereto)

or to a subsequent re-transmission of said value or combination of values, by re-transmitting the remainder of its identity code.

In other circumstances, the transmissions from each of the simultaneously transmitting transponders may interfere with one another so that the interrogation device is unable to determine the identity of any of those transponders. The interrogation device is therefore preferably arranged to detect any such interference between the simultaneous transmissions of two or more transponders and, where interference is detected, to interrogate those transponders further.

Preferably each group response signal comprises a transmission in one of a plurality of time slots, each time slot corresponding to a particular value.

An embodiment of the present invention will now be described by way of examples only and with reference to the accompanying drawings.

DETAILED DESCRIPTION OF THE PREFERRED EMBODIMENT

Figure 1:
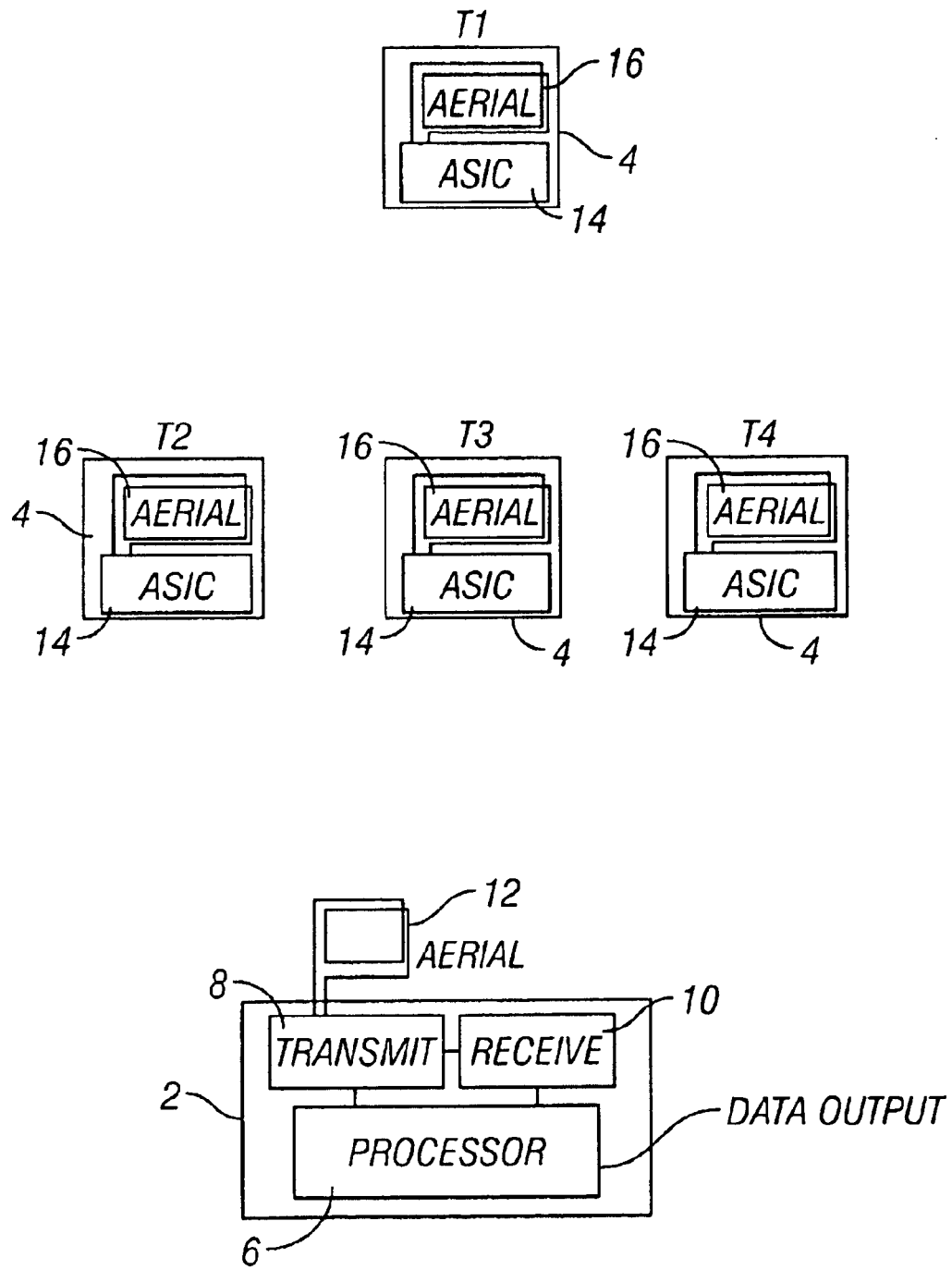
FIG. 1 is a schematic illustration of a transponder identification system in accordance with the present invention; and, FIG. 2 is a flow chart of a preferred sequence of operation of the system of FIG. 1.

Referring to FIG. 1 of the drawings, a transponder identification system is shown comprising an interrogation device (reader) 2 and a plurality of transponders 4 (tags).

The interrogation device 2 comprises a processor 6 connected to respective means 8 and 10 for transmitting and receiving signals via an aerial 12.

Each transponder 4 comprises an application specific integrated circuit (ASIC) 14 which comprises processing means as well as means for transmitting and receiving signals via an aerial 16.

Figure 2A:
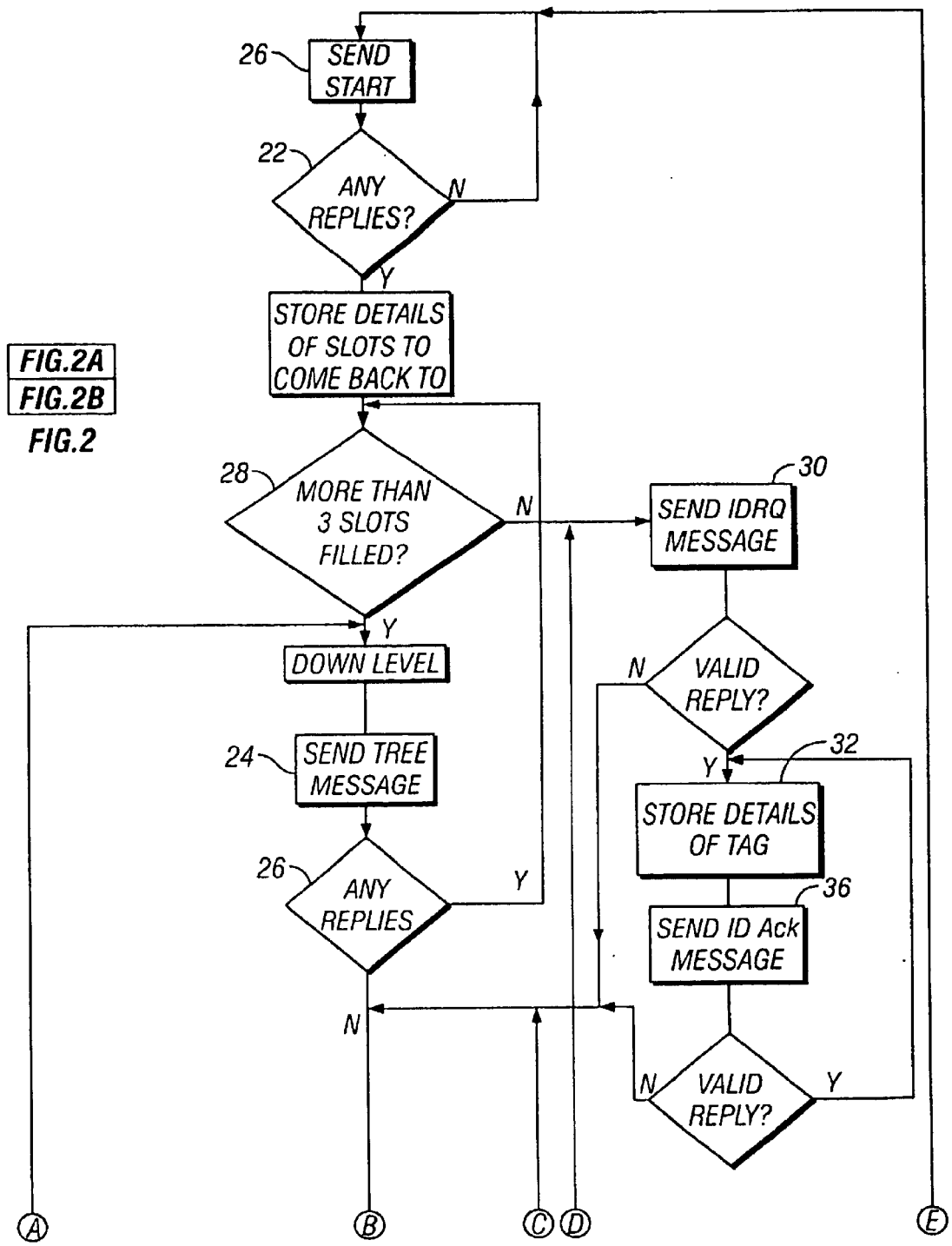
Figure 2B:
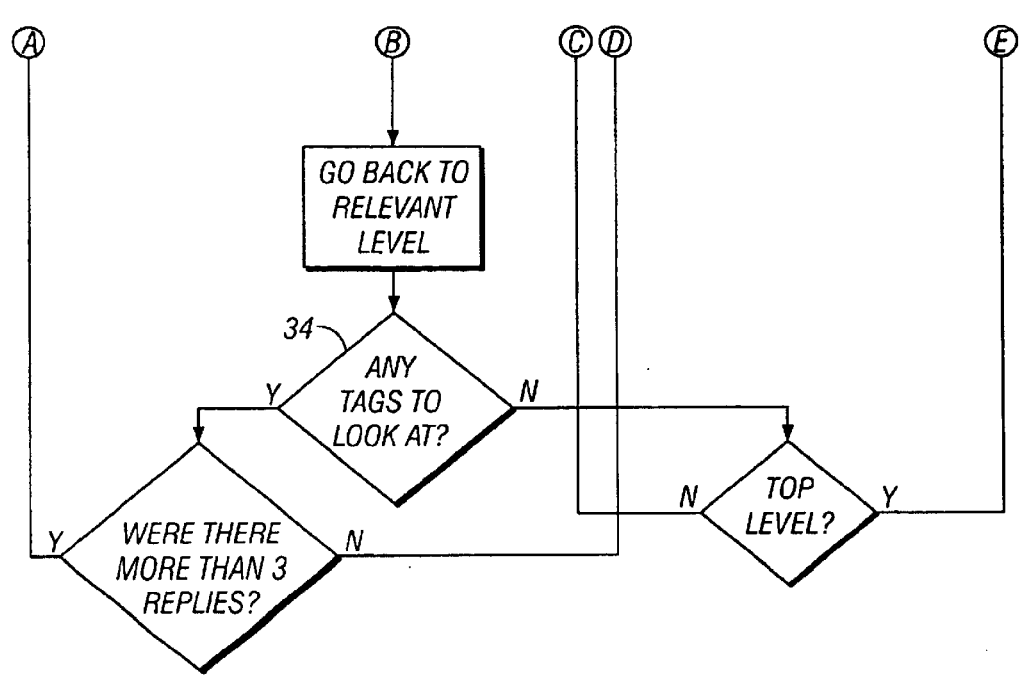

In order to identify any transponder lying within its range, the interrogation device 2 follows the sequence shown in FIG. 2 and first transmits at 20 a radio frequency initiation signal (a START message), in response to which each transponder 4, within range, will transmit at 22 a radio frequency response signal in a time slot corresponding to the value held by the transponder in a first field. For example, a transponder having the value 3 stored in its first field might transmit a response signal in a third time slot, a transponder having the value 1 in a first time slot, etc.

The interrogation device 2 then transmits at 24, in turn, the or each value held by at least one transponder 4 in its first field (a TREE message), in response to which any unidentified transponder, having that value in its first field, will transmit at 26 a response signal in a time slot corresponding to the value held by the transponder in a second field.

If responses are transmitted to the interrogation device 2 in fewer than a predetermined number of time slots, at 28 the interrogation device 2 will transmit at 30, in turn, the respective value or combination of values (an IDRQ message) corresponding to the or each time slot, to which any unidentified transponder having that value or combination of values in its respective field or fields will respond by transmitting at 32 the remainder of its unique identity code.

If any transponder then remains unidentified at 34, the interrogation device 2 will transmit at 24, in turn, the or each combination of values held by at least one transponder in its first and second fields (a further TREE message), in response to which any unidentified transponder, having that combination of values in its first and second fields, will transmit at 26 a response signal in a time slot corresponding to the value held by the transponder in a third field.

Again, if responses are transmitted to the interrogation device 2 in fewer than a predetermined number of time slots at 28, the interrogation device 2 will transmit at 30, in turn, the respective combination of values (an IDRQ message) corresponding to the or each time slot, to which any unidentified transponder having that value or combination of values in its respective field or fields will respond by transmitting 32 the remainder of its unique identity code.

The interrogation device may continue, if necessary, to carry out further stages of its tree-search until the identity of each transponder has been determined.

In the preferred embodiment of FIG. 1, the signals transmitted by each of the transponders 4 are binary phase shift key (BPSK) modulated and transmitted at a frequency of between 60 and 90 kHz. The interrogation device 2 will therefore tend to receive transmissions from only one or other of two or more simultaneously transmitting transponders.

The system is therefore arranged such that, once a transponder has successfully responded to a particular value or combination of values (an IDRQ message), to provide the interrogation device 2 with the remainder of its identity code, an acknowledgment signal (an IDAck message) comprising the full identity code of the transponder is then transmitted at 36 by the interrogation device. The identified transponder, having received an acknowledgment signal, will not transmit a response thereto and will be prevented from responding to further interrogation signals. A "silenced" transponder will, however, continue to respond to an "are you still there?" message comprising either the transponder's full identity code or another code which uniquely defines the transponder. The or each other transponder, having the same said value or combination of values in its corresponding fields, will, on the other hand, respond either to the acknowledgment signal (where the identified transponder does not transmit a response thereto) or to a subsequent re-transmission of said value or combination of values, by re-transmitting the remainder of its identity code.

The IDAck message indicates, to each transponder 4, how many bits (or fields) of the transponder's identity code (starting at its least significant bit) are to match corresponding bits in the IDAck message, for the transponder to re-transmit its full, or the remainder of its identity code. The number of bits (or fields) will clearly depend upon extent by which the tree search has progressed.

Where two or more transponders respond simultaneously to an IDRQ message, the transmissions from each of the transponders may, in certain circumstances, interfere with one another so that the interrogation device 2 is unable to determine the identity of any of those transponders. The interrogation device 2 is therefore also arranged to detect any such interference between the simultaneous transmissions of two or more transponders and, where interference is detected, to proceed with one or more stages of its tree search to distinguish between those transponders.

As an illustration of the above processes, consider how the interrogation device 2 might identify each of four transponders, having the respective identity codes—

| | |
|---|---|
| Transponder 1 | 0010123 octal (000000001000001010011 binary) |
| Transponder 2 | 0010343 |
| Transponder 3 | 0010032 |
| Transponder 4 | 0010456 |

As shown above, each identity code comprises 21 bits, divided into seven fields of three bits each. Each field may therefore store one of eight possible values, so that a transponder may indicate the value stored in one of its fields by transmitting a response in a corresponding one of eight time slots.

To initiate the interrogation of the transponders, the interrogation device 2 would first transmit a START message comprising the code 001** octal (000 001 * * * *** binary)

Whilst, in the present example, the four transponders each respond to the same START message, this would not always be the case and, in other arrangements, two or more transponders may be programmed to respond to different respective START messages. The START message may, for example, identify the interrogation device from which the message originated.

Returning to the present example, in response to the START message, a response would be received in time slots 2,3 and 6: a response in slot 2 from transponder T3, whose three least significant digits store the value 2; a response in slot 3 from transponders T1 and T2, whose three least significant digits store the value 3; and a response in slot 6 from transponder T4, whose three least significant digits store the value 3.

Say, for instance, it was decided that the tree search would be truncated when a response was obtained in fewer than three time slots, the interrogation device would then proceed to issue each of the following messages in turn—

| | | | |
|---|---|---|---|
| TREE | XXX2 | | to which a reply will be received in slot 3 from transponder T3 |
| IDRQ | XX32 | | to which transponder T3 will provide its full identity code |
| IDAck | 0032 | (6) | to which no further reply will be received |
| TREE | XXX3 | | to which a reply will be received in slot 2 from transponder T1 and in slot 4 from transponder T2 |
| IDRQ | XX23 | | to which transponder T1 will provide its full identity code |
| IDAck | 0123 | (6) | to which no further reply will be received |
| IDRQ | XX43 | | to which transponder T2 will provide its full identity code |
| IDAck | 0343 | (6) | to which no further reply will be received |
| TREE | XXX6 | | to which a reply will be received in slot 5 from transponder T4 |
| IDRQ | XX56 | | to which transponder T4 will provide its full identity code |
| IDAck | 0456 | (6) | to which no further reply will be received |

Note that the value in brackets indicates to a receiving transponder how many bits of the transponder's identity code (starting at its least significant bit) are to match corresponding bits in the IDAck message, for the transponder to re-transmit its full, or the remainder of its identity code.

If, on the other hand, it was decided that the tree search would be truncated when a response was obtained in fewer than four time slots, the interrogation device would instead proceed to issue each of the following messages in turn—

| | | | |
|---|---|---|---|
| IDRQ | XXX2 | | to which transponder T3 will provide its full identity code |
| IDAck | 0032 | (3) | to which no further reply will be received |
| IDRQ | XXX3 | | to which transponder T2 will provide its full identity code (it being the transponder closest to the interrogation device) |
| IDAck | 0343 | (3) | to which transponder T1 will provide its full identity code |
| IDAck | 0123 | (3) | to which no further reply will be received |
| IDRQ | XXX6 | | to which transponder T4 will provide its full identity code |
| IDAck | 0456 | (3) | to which no further reply will be received |

If, however, the transmissions from transponders T1 and T2 were to interfere with one another, the interrogation device would instead issue each of the following messages in turn—

| | | | |
|---|---|---|---|
| IDRQ | XXX2 | | to which transponder T3 will provide its full identity code |
| IDAck | 0032 | (3) | to which no further reply will be received |
| IDRQ | XXX3 | | to which a corrupted reply will be received from transponders T1 and T2 |
| TREE | XXX3 | | to which a reply will be received in slot 2 from transponder T1 and in slot 4 from transponder T2 |
| IDRQ | XX23 | | to which transponder T1 will provide its full identity code |
| IDAck | 0123 | (6) | to which no further reply will be received |
| IDRQ | XX43 | | to which transponder T2 will provide its full identity code |
| IDAck | 0343 | (6) | to which no further reply will be received |
| IDRQ | XXX6 | | to which transponder T4 will provide its full identity code |
| IDAck | 0456 | (3) | to which no further reply will be received |

From the above examples, it will be appreciated that the system thus described, i.e. one which truncates its tree search when replies have been received in fewer than a pre-determined number of time slots, provides a means for identifying each of a plurality of transponders in its field in considerably less time than it would take a conventional system carrying out a full tree search.

What is claimed is:

1. A transponder identification system comprising:

a plurality of transponders, each comprising means for storing therein a unique identity code which comprises a plurality of fields, each said field holding a respective value selected from a plurality of possible values; and an interrogation device which is arranged to determine the identity of each transponder by transmitting successive series of interrogation signals, the interrogation device being arranged to transmit an initial interrogation signal, in response to which each transponder will transmit a group response signal in a time slot which is selected from a plurality of possible time slots and corresponds to the value held by the transponder in its first said field, so that the interrogation device may then transmit a second interrogation signal which includes the value held in the first field of at least one transponder which responded to said initial interrogation signal, in response to which each transponder having that value in its first field will transmit a group response signal in a time slot which is selected from a plurality of possible time slots and corresponds to the value held by that transponder in its second said field, so that the interrogation device may then transmit a third interrogation signal which includes the combination of values held in the first and second fields of at least one transponder which responded to said second interrogation signal, in response to which each transponder having that combination of values in its first and second fields will transmit a group response signal in a time slot which is selected from a plurality of possible time slots and corresponds to the value held by that transponder in its third said field, and so on, until the identity code of each transponder has been determined;

the interrogation device being further arranged to detect where fewer than a predetermined number of uncorrupted group response signals are received in different time slots in response to the transmission of any one said interrogation signals, and, in such event, to transmit, in turn, identity request signals each including the respective combination of values corresponding to each time slot in which, in response to that interrogation signal, a response has been received, to which any unidentified transponder holding that combination of values in its corresponding fields will respond by transmitting the remainder of its unique identity code, the interrogation device being arranged to distinguish between two or more transponders which may, simultaneously with each other transmit the remainder of their respective identity codes.

2. A transponder identification system as claimed in claim 1, wherein the interrogation signals are transmitted as part of an ordered tree-search process.

3. A transponder identification system as claimed in claim 1, arranged such that, once a transponder has successfully responded to a particular value or combination of values to provide the interrogation device with the remainder of its identity code, an acknowledgment signal comprising the full identity code of the transponder is then transmitted by the interrogation device to prevent the identified transponder from responding to further interrogation signals.

4. A transponder identification system as claimed in claim 3, wherein, having received an acknowledgement signal, the identified transponder will continue to respond to an "are you still there" signal comprising either the transponder's full identity code or another code which uniquely defines the transponder.

5. A transponder identification system as claimed in claim 3, wherein the identified transponder does not transmit a response to the acknowledgement signal.

6. A transponder identification system as claimed in claim 5, wherein each transponder, other than the identified transponder, having the same said value or combination of values in its corresponding fields, will respond to the acknowledgment signal by re-transmitting the remainder of its identity code.

7. A transponder identification system as claimed in claim 1, wherein each transponder, other than the identified transponder, having the same said value or combination of values in its corresponding fields, will respond to a subsequent re-transmission of said value or combination of values by re-transmitting the remainder of its identity code.

8. A transponder identification system as claimed in claim 1, arranged to detect any interference between the simultaneous transmissions of two or more transponders and, where interference is detected, to interrogate those transponders further.

* * * * *